US008076928B2

(12) United States Patent
Nunally

(10) Patent No.: US 8,076,928 B2
(45) Date of Patent: Dec. 13, 2011

(54) SYSTEM AND METHOD FOR IN-SITU INTEGRITY AND PERFORMANCE MONITORING OF OPERATING METALLIC AND NON-METALLIC NATURAL GAS TRANSMISSION AND DELIVERY PIPELINES USING ULTRA WIDEBAND POINT-TO POINT AND POINT-TO POINT AND POINT-TO-MULTIPOINT COMMUNICATION

(76) Inventor: Patrick O'Neal Nunally, Escondido, CA (US)

( * ) Notice: Subject to any disclaimer, the term of this patent is extended or adjusted under 35 U.S.C. 154(b) by 1615 days.

(21) Appl. No.: 11/433,334

(22) Filed: May 12, 2006

(65) Prior Publication Data

US 2007/0261505 A1 Nov. 15, 2007

Related U.S. Application Data

(60) Provisional application No. 60/680,240, filed on May 13, 2005.

(51) Int. Cl.
*G01N 27/82* (2006.01)
*G01M 3/00* (2006.01)

(52) U.S. Cl. ..................... 324/220; 324/221; 73/40.5 R; 73/49.1

(58) Field of Classification Search .................. 324/220, 324/221

See application file for complete search history.

(56) References Cited

U.S. PATENT DOCUMENTS

| | | | | | |
|---|---|---|---|---|---|
| 3,299,695 | A * | 1/1967 | Dickinson, III | 73/627 |
| 4,443,948 | A | 4/1984 | Reeves | |
| 4,639,669 | A * | 1/1987 | Howard et al. | 324/239 |
| 4,675,604 | A * | 6/1987 | Moyer et al. | 324/220 |
| 4,785,175 | A | 11/1988 | Wormald | |
| 5,049,817 | A * | 9/1991 | Cecco et al. | 324/220 |
| 5,270,647 | A * | 12/1993 | Beissner et al. | 324/240 |
| 6,243,483 | B1 | 6/2001 | Petrou | |
| 6,813,949 | B2 | 11/2004 | Masaniello | |
| 7,526,944 | B2 * | 5/2009 | Sabata et al. | 73/49.1 |
| 2005/0145018 | A1 * | 7/2005 | Sabata et al. | 73/49.1 |
| 2006/0076951 | A1 | 4/2006 | Nestleroth | |

* cited by examiner

*Primary Examiner* — Jay Patidar
(74) *Attorney, Agent, or Firm* — Stein McEwen, LLP

(57) ABSTRACT

An operational monitoring system for use in communications, and a method thereof, for operational, systems or integrity management of pipeline infrastructures which operates by broadcasting wireless signals through gas distribution networks and analyzing the traversed signals to assess the operational, systems or integrity of the natural gas pipelines. The operational monitoring system includes a transmitter located at a first location arranged to transmit a wireless signal through natural gas contained within a pipeline infrastructure; a receiver located at a second location structured to receive the wireless signal transmitted through the natural gas contained within the pipeline infrastructure; and a device to analyze the received wireless signal indications of operational changes in the natural gas pipeline infrastructure.

23 Claims, 4 Drawing Sheets

100

PRIOR ART

SYSTEM AND METHOD FOR IN-SITU INTEGRITY AND PERFORMANCE MONITORING OF OPERATING METALLIC AND NON-METALLIC NATURAL GAS TRANSMISSION AND DELIVERY PIPELINES USING ULTRA WIDEBAND POINT-TO POINT AND POINT-TO POINT AND POINT-TO-MULTIPOINT COMMUNICATION

CROSS-REFERENCE TO RELATED APPLICATION

This application claims the benefit of U.S. provisional application No. 60/680,240, filed May 13, 2005.

FIELD OF THE INVENTION

The present invention generally relates to communications. More particularly, the invention concerns methods and systems for operational, systems or integrity management of pipeline infrastructures. These systems and methods lend themselves to the applications such as, but not limited to:

1. pipeline damage detection, location, classification or notification
2. pipeline tampering detection, location, classification or notification
3. pipeline operational deviation, detection, location, classification or notification
4. deviation, detection, location, classification or notification of changes in dielectric constants of a pipelines content,
5. remote data gathering from elements of the operational or distribution infrastructure of the gas pipelines or their content.

This invention operates by broadcasting wireless signals through gas distribution networks and analyzing the traversed signals to assess said operational, systems or integrity of said natural gas pipelines.

BACKGROUND OF THE INVENTION

Mechanical damage of metallic subterranean natural gas pipelines can be measured by a variety of methods, including impulse diffraction, ultrasonic and electromagnetic techniques. Because of the limited penetration depth, impulse diffraction is restricted to measurements of gross characteristics, generally in a limited environment. Ultrasonic techniques measure the velocity of ultrasonic waves in the metals themselves and relate those measurements to stress or breaks. There are however, difficulties in differentiating stress effects from the texture of the material and this becomes ineffective in non-metallic natural gas pipeline structures. With electromagnetic techniques, one or more of the magnetic properties (such as permeability, magnetostriction, hysteresis, coercive force, or magnetic domain wall motion during magnetization) of a ferromagnetic material are sensed and can be correlated to damage or stress yet again this is limited to the metallic characteristics of the natural gas pipeline.

The aforementioned techniques rely on detecting the change in magnetic properties of the material caused by stress which is known as the magnetoelastic effects. Many of these techniques are difficult to implement without a controlled samples available while the measurement is being done. In addition, these techniques are less sensitive to changes in the magnetic properties of ferromagnetic materials caused by stress other than nonlinear harmonics techniques. Methods such as pigging which, involves a device moving through the pipeline at a relatively high rate of speed, are also means of experimental testing within a pipeline however, are inappropriate for real-time damage detection and prediction.

Detection and characterization of the wireless communication signal conveyance caused by mechanical or dialectic change of or within the pipelines or the earthen duct defined by pipelines, particularly natural gas transmission pipelines, is important because of the danger to pipeline integrity posed by third party damage or tampering as well as the need to optimize the infrastucture operations.

Therefore, there exists a need for more efficient systems and methods of providing operational and/or integrity monitoring either on a continuous basis or on an as needed bases and can operate through metallic and/or non-metallic natural gas pipelines.

SUMMARY OF THE INVENTION

This invention relates generally to nondestructive in-situ methods and systems for identification, classification and/or location of potential tampering and/or damage to metallic and/or non-metallic natural gas pipelines.

More particularly, the invention uses wireless communication techniques to detect physical variation of natural gas pipelines, the pipelines content as well as changes in the immediate vicinity of buried non-metallic natural gas pipelines. The invention in a preferred embodiment uses a time-domain transmission within the pipeline which is transceived at one both ends of the monitored length of natural gas pipeline. This invention specifically monitors the shapes, amplitudes and characteristics of the conveyed transmissions to determine if the pipeline and/or the earthen duct defined by the pipeline or the pipeline itself has been potentially excavated, changed, redirected, pierced or damaged.

A wireless communication signal traversing a natural gas pipeline is changed by the physical characteristics of path of natural gas pipeline in which it travels. This alteration of the signal can be thought of as a transfer function defined by the physical characteristics of the pipeline itself. The transfer function can be determined via algorithmic models or can simply be characterized by analysis of received signal outputs resultant from known signal inputs. In-situ detection and classification of mechanical variations of natural gas pipelines is justified because most of the reportable incidents of problems related to operating pipelines are caused by third party contact with pipelines that result in mechanical damage.

The preferred embodiment of the method and system of the present invention uses time-domain communication techniques to detect and characterize relevant variations in and around non-metallic as well as metallic natural gas pipelines. This wireless communication approach can make use of numerous variables as part of its operational monitoring, classification and/or detection of damage including but, not limited to temporal, amplitude, phase and multi-path characteristics as altered by the physical path of the natural gas pipeline which is being monitored. Once characterized, data transfers which are varied by the physical structure of the natural gas pipeline and/or the earthen duct defined by the non-metallic pipeline are transferred between monitoring points and normalized with a limited range of variance which compensates for acceptable levels of variation created by temperature variations, long-period oscillations of the earth, etc. Normalization (or filtering) of these acceptable variations in the natural gas pipeline can be provided for algorithmically (preferably via digital signal processing techniques) thus delivering data from one monitoring point to another with effective error correction and compensation of the data signals. This effective error correction and/or compensation of the data signals effectively establishing a set of complex thresholds as required by the multifaceted definition of acceptable variance. Whether simple, algorithmic or digital signal processing techniques are employed, data solely representing broadband communication, damage detection or both may traverse between the end-points of the monitoring process with the acceptable monitoring and classification variations of the natural gas pipeline. While data may still traverse the natural gas pipeline it may detect data variation or compensation variations which are outside of defined acceptable thresholds per this invention and can be gathered, recorded, provided on an exception, scheduled and/or continuously delivered to a monitoring agent.

A second embodiment of the present invention provides a system and method in which non-time domain signals are employed to transmit information through an active natural gas medium, where the medium is contained within natural gas piping system, specifically a natural gas distribution system and identifies changes in said wireless communication signals and relates these changes of interest in the mechanical medium (the natural gas pipeline) through which the signal is conveyed.

In one application of the preferred embodiment the invention, a method of recognizing tampering and/or damage in a natural gas pipeline includes transceiving an impulse or ultra-wideband signal from a point within the natural gas pipeline. Time domain communications comprise transmission formats such that the signal can be provided at a relatively high power level while not generating substantial heat (thus not igniting the natural gas within the gas pipeline distribution network) and not radiating spectral energy sufficient to interfere with FCC requirements (augmented by the fact that gas pipelines generally must be buried to a known depth within most communities (hence are inherently shielded by ground—literally). This method of recognizing tampering and/or damage involves the steps of providing a local in situ natural gas pipeline distribution medium with a transmitting, receiving or preferably transceiving of an ultra-wideband signal across the pipeline medium which is representative of data or signals used to detect changes at or between one, a plurality or a multiplicity of other transceiving devices located at other points on the same contiguous gas pipeline distribution network. Another embodiment of the present invention comprises a method of increasing the tampering and/or detection quantity, by combining through time a multiplicity of ultra-wideband signals representative of a stable set of data transformations created by the physical structure of the natural gas pipeline medium and identifying off-sets in the time, amplitude, phase and/or multi-path from previously identified stable data. The combined services delivery comprising the multiplicity of ultra-wideband signals representative of data tampering and/or damage and the natural gas utility delivery are received and the two services are then separated into the multiplicity of ultra-wideband signals representative of pipeline integrity information and the utility delivery of natural gas.

One feature of the preferred embodiment of the present invention is that an ultra-wideband signal can be transmitted simultaneously with a traditional natural gas utility delivery where such a signal can bear any combination of data representative of Internet, video, television, HDTV, voice or other transmission signal but can make use of known pieces of data to calibrate data services delivery and can be used to evaluate variations in the pipeline delivering said data. Because the ultra-wideband signal can be transmitted simultaneously with the gas delivery services and be provided over existing steal or plastic natural gas piping, the overall capability of the system to deliver value (i.e., gas delivery and connectivity) without requiring costly last mile deployments and without interfering with licensed and unlicensed spectrum enables a previously unobtainable level of monitoring and evaluation of natural gas distribution infrastructures.

Figure 1:
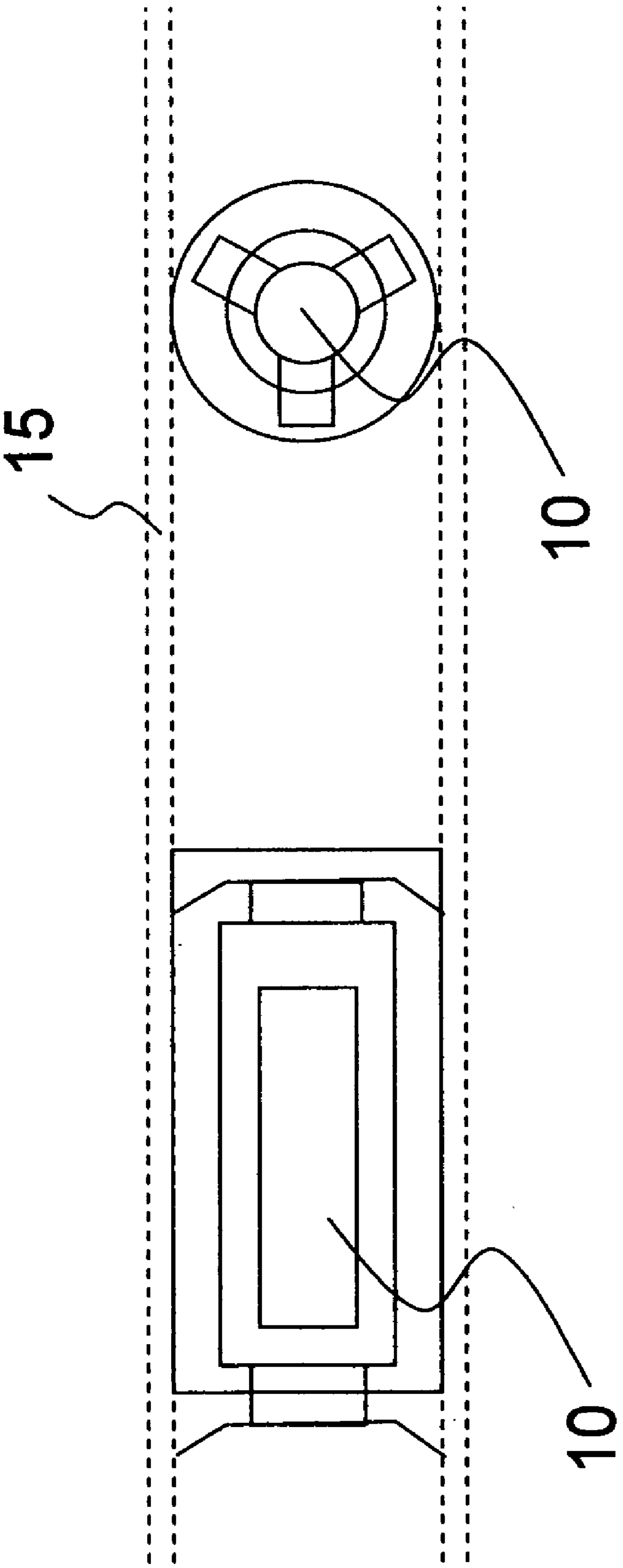
FIG. 1 is an illustration of previous wireless communication damage detection methods.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the preferred embodiment of the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Generally, a traditional cable television provider, a community antenna television provider, a community access television provider, a cable television provider, a hybrid fiber-coax television provider, an Internet service provider, or any other provider of television, audio, voice and/or Internet data receives broadcast signals at a central station, either from terrestrial cables, and/or from one or more antennas that receive signals from a communications satellite. The broadcast signals are then distributed, usually by coaxial and/or fiber optic cable, from the central station to nodes located in business or residential areas.

For example, community access television provider (CATV) networks are currently deployed in several different topologies and configurations. The most common configurations found today are analog signals transmitted over coaxial cable and Hybrid Fiber-Coax Systems (HFCS) that employ both fiber optic and coaxial cables. The analog coax systems are typically characterized as pure analog systems. Pure analog CATV systems are characterized by their use of established NTSC/PAL (National Television Standards Committee/Phase Alternation Line) modulation onto a frequency carrier at 6 or 8 MHz intervals.

HFCS is a combination analog-digital topology employing both coaxial (analog) and fiber optic (digital) media that typically supports digitally modulated/encoded television channels above channel 78. According to ANSI/EIA-542-1997, in the United States, the analog channels are modulated in 6 MHz allocations on channels 2 to 78 using frequencies from 55 to 547 MHz. When using HFCS, digital channels typically start at channel 79 and go as high as 136 and occupy a frequency range from 553 to 865 MHz. In some extended HFCS systems, channel assignments can go as high as channel 158 or 997 MHz. The current ANSI/EIA-542-1997 standard only defines and assigns channels to these limits. The actual wire/cable media itself is generally capable of transmitting frequencies up to 3 GHz.

In both CATV and HFCS systems, typically the satellite downlink enters the cable company's head-end and the video, and/or other data streams are de-multiplexed out. Individual video data streams (either NTSC, MPEG, or any other suitable protocol) are extracted from the satellite downlink stream and routed to modulators specific for individual television channels. The outputs from each modulator are then combined into one broadband signal. From this point, the combined channels are amplified and sent out, either by coaxial or fiber optic cable, to the customers.

In a HFCS, before the combined broadband signal leaves the head-end, the broadband signal is modulated onto a fiber optic cable for distribution into the field, such as residential neighborhoods, or business districts. Modulation of the broadband signal is typically accomplished in one of two ways. In the first method, the entire broadband signal is sampled and digitized using a high speed Analog to Digital Converter (ADC). To perform reliable digital sampling, the data must be sampled at a rate of at least twice the highest frequency component to meet Nyquist minimum sampling requirements. To provide a higher quality data stream, the signal should be sampled at 2.5 to 4 times the highest frequency, which entails sample rates of approximately 2 to 4 GHz. A parallel to serial converter then shifts the parallel output data of the ADC into a serial format. The serial data then drives a laser diode for transmission over the fiber optic cable. The second method is broadband block conversion where the entire spectrum of the broadband signal is modulated onto the fiber optic cable.

Designated access nodes are located in neighborhoods, business districts and other areas. The access nodes contain a high speed Digital to Analog Converter (DAC) and a de-serializer. A fiber optic receiver detects the laser-modulated signal at the access node. A parallel to serial converter de-serializes the data and it is fed to the high speed DAC. The data then leaves the access node on standard 75 ohm, RG-6 or RG-8 or other suitable coax cable and is distributed to the customer's premises. Thus, at the access node, the broadband signal is extracted from the fiber optic cable and transferred to a coaxial cable that connects to individual homes, apartments, businesses, universities, and other customers. Support of multiple customers is generally accomplished by the use of distribution boxes in the field, for example, on telephone poles or at ground level. However, as the signal is continuously split at the distribution boxes, the received bandwidth is reduced and the quality of the signal is diminished, thereby diminishing the video, audio, and other data quality.

The digital channels that generally reside on CATV channels 79 and higher are fundamentally different than the analog channels that generally reside on channels 2 through 78. The analog channels are comprised of modulated frequency carriers. The digital channels, which generally use the 6 MHz allocation system, are digitally modulated using Quadrature Amplitude Modulation (QAM). QAM is a method of combining two amplitude modulated signals into a single channel, thereby doubling the effective bandwidth. In a QAM signal, there are two carriers, each having the same frequency but differing in phase by 90 degrees. The two modulated carriers are combined for transmission, and separated after transmission. QAM 16 transmits 16 bits per signal, QAM 32, 64, and 256 each transmit 32, 54 and 256 bits per signal, respectively. QAM was developed to support additional video streams encoded with MPEG video compression. Conventional CATV and HFCS networks may employ QAM levels up to QAM 64 to enable up to 8 independent, substantially simultaneous MPEG video streams to be transmitted.

At the customer's location, the coaxial cable is connected to either a set-top box or directly to a television. The receiving device then de-multiplexes and de-modulates the video, audio, voice, Internet or other data. Although a television can directly receive the analog signal, a set-top box is generally required for reception of the digitally encoded channels residing on CATV channels 79 and higher.

The above-described networks, and other networks and communication systems that employ wired media, such as twisted-pair or coaxial cable, suffer from performance limitations caused by signal interference, ambient noise, and spurious noise. In these conventional natural gas pipeline media systems, these limitations affect the available system bandwidth, distance, and carrying capacity of the system, because the noise floor and signal interference in the wired media rapidly overcome the signal transmitted. Therefore, noise within the wire line media significantly limits the available bandwidth of any communication system or network.

Generally, the conventional wisdom for overcoming this limitation is to boost the power (i.e., increase the voltage of the signal) at the transmitter to boost the voltage level of the signal relative to the noise at the receiver. Without boosting the power at the transmitter, the receiver is unable to separate the noise from the desired signal. Thus, the overall performance of natural gas pipeline media systems is still significantly limited by the accompanying noise that is inherent in wire line media.

Increasing the bandwidth of communication without employing costly wire line or fiber optic connectivity to the home/business, while coexisting with the conventional natural gas utility delivery system, represents an opportunity to leverage the existing unutilized transmission media network infrastructure to enable the delivery of greater functionality.

The present invention may be employed in any type of natural gas delivery segment that uses buried or shielded pipe to deliver natural gas, in whole, or in part. That is, this inventions resultant tampering and/or damage detection may be utilized in natural gas pipeline media, such as steel or plastic pipe, and linked to no fewer that one of the following: natural gas pipeline, optical, wireless, or satellite networks.

As defined herein, tampering and/or damage is detected by one or preferably by a group of points or nodes connected by communication paths. The communication paths may be connected by wires, fiber optic, or they may be wirelessly connected however at least one segment must utilize a wireless connection transmitted within a underground or shielded natural gas pipeline. A tampering and/or damage detection system and method as defined herein can interconnect with other data networks and contain subnetworks. A tampering and/or damage detection system and method as defined herein can be characterized in terms of a spatial distance, for example, such as a local area tampering and/or damage detection system, a metropolitan area tampering and/or damage detection system, and a wide area tampering and/or damage detection system, among others. A tampering and/or damage detection system and method as defined herein can also be characterized by the type of data transmission technology in use on it, for example, a TCP/IP network, and a Systems Network Architecture network, among others. A tampering and/or damage detection system as defined herein can also be characterized by whether it solely carries for use in the detection and classification of tampering and/or damage or additionally carries voice, data, or both kinds of signals. A network as defined herein can also be characterized by who can use the network, for example, a public switched telephone network (PSTN), other types of public networks, and a private network (such as within a single room or home), among others. A network as defined herein can also be characterized by the usual nature of its connections, for example, a dial-up network, a switched network, a dedicated network, and a nonswitched network, among others. A network as defined herein can also be characterized by the types of physical links that it employs, for example wireless in gas pipeline and any one of the following optical fiber, coaxial cable, a mix of both, unshielded twisted pair, and shielded twisted pair, among others.

The preferred embodiment of the present invention employs a "carrier free" architecture which does not require the use of high frequency carrier generation hardware, carrier modulation hardware, stabilizers, frequency and phase discrimination hardware or other devices employed in conventional frequency domain communication systems. The preferred embodiment of the present invention dramatically increases the bandwidth of the conventional last mile natural gas pipeline and wireless networks that employ natural gas pipeline, optical or in air wireless media, but can be inexpensively deployed without extensive modification to the existing natural gas delivery networks.

The present invention provides increased bandwidth by injecting, or otherwise super-imposing a wireless signal into the existing natural gas delivery systems and subsequently recovers the signal at an end node, set-top box, subscriber gateway, or other suitable location resident on the same contiguous natural gas pipeline. In the preferred embodiment of the invention the wireless signal is of the from an impulse radio and thus employs pulses of electromagnetic energy that are emitted at nanosecond or picosecond intervals (generally tens of picoseconds to a few nanoseconds in duration). For this reason, ultra-wideband is often called "impulse radio." Because the excitation pulse is not a modulated waveform, wireless has also been termed "carrier-free" in that no apparent carrier frequency is evident in the radio frequency (RF) spectrum. That is, the wireless pulses are transmitted without modulation onto a sine wave carrier frequency, in contrast with conventional radio frequency technology. Ultra-wideband requires neither an assigned frequency nor a power amplifier.

Conventional radio frequency technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

An example of a current system of monitoring the integrity of buried pipelines makes use of a physical device (10) which collecting data as it moves through the pipeline (15) is illustrated in FIG. 1.

Figure 2:
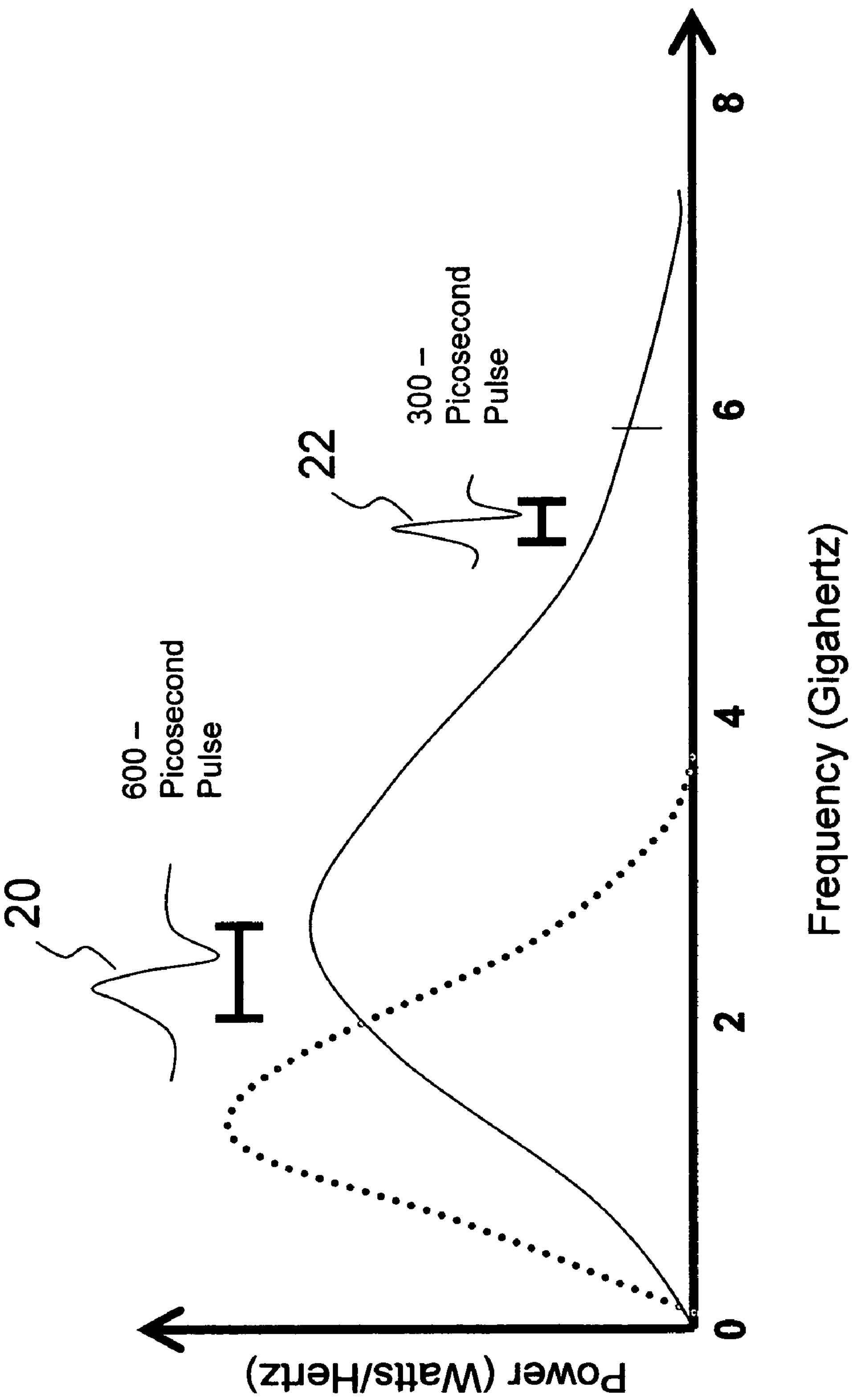
FIG. 2 is an illustration of two ultra-wideband pulses.

In one preferred embodiment; an impulse which may have a 1.8 GHz center frequency, with a frequency spread of approximately 4 GHz, as shown in FIG. 2, illustrates two typical wireless transmissions used to traverse the pipeline. The pulses shown in FIG. 2 illustrates that the narrower the wireless pulse in time, the higher its center frequency and the broader the spread of its frequency spectrum. This is because frequency is inversely proportional to the time duration of the pulse. A 600 picosecond wireless pulse will have about a 1.8 GHz center frequency (20), with a frequency spread of approximately 4 GHz. And a 300 picosecond wireless pulse will have about a 3 GHz center frequency (22), with a frequency spread of approximately 8 GHz. Thus, wideband pulses generally do not operate within a specific frequency, and because these pulses are spread across an extremely wide frequency range, these wireless signals are preferred as they are more easily recoverable and can provide greater amounts of relative information.

Further details of impulse communication technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because these pulses are spread across an extremely wide frequency range, the power sampled at a single, or specific frequency is very low. For example, a one-watt signal of one nano-second duration spreads the one-watt over the entire frequency occupied by the pulse. At any single frequency, the pulse power present is one nano-watt (for a frequency band of 1 GHz). Generally, the multiplicity of pulses are transmitted at relatively low power (when sampled at a single, or specific frequency), for example, at less than −30 power decibels to −60 power decibels, which minimizes interference with conventional radio frequencies. However, wireless pulses transmitted through most buried or shielded natural gas pipelines will not interfere with wireless radio frequency transmissions. Therefore, the power (sampled at a single frequency) of wireless pulses transmitted though natural gas pipeline media may range from about +100 dB to about −90 dB.

For example, in a preferred embodiment of this invention, data is provided via a fiber optic, wired or wireless means to a local network node. This data may contain data segments for use as test data for transmission into the natural gas pipeline in the wireless communication format. This data is then received by a second transceiver on the other side of the length of natural gas pipeline being monitored. When said transmitted test data is received on the other side of said length of natural gas pipeline being monitored, then it is analyzed to detect tampering or damage of the gas pipeline between the two points of monitoring.

In a simple example of use, data representing a random data pattern may be transmitted into a natural gas pipeline at a first point of monitoring. The second point of monitoring trains on specific amplitudes of signals related to a complex threshold of acceptability based on time of year, temperature, etc. Upon the condition of a second monitoring point, detecting a sudden drop in amplitude but signal still being present, the second monitoring point can correlate this condition to the excavation of a spectrally transparent plastic portion of the natural gas pipeline. While this is a simple illustrative example of one straightforward embodiment of this invention, it is anticipated that numerous variables including temporal, amplitude, phase, multi-path and other signal characteristics may be used as part of complex analysis via digital signal processing and predictive algorithmic techniques. Considering these variables, it is understood to those skilled in the art that many complex digital signal processing techniques can be utilized to detect, classify and predict conditions of relevance to third party tampering and/or damage detection.

The preferred embodiment may alternately make use of only one or optionally a plurality of monitoring points. In the case of a single monitoring point, detection is based on reflected signals as opposed to traversing signals and alternately data may be transmitted from a plurality of monitoring points and received by combinations of monitoring points such that data may be correlated and analyzed.

As discussed above, an wireless system transmits a narrow time domain pulse, and the signal power is generally evenly spread over the entire bandwidth occupied by the signal. At any instantaneous frequency, such as at the AM or QAM carrier frequency, the wireless pulse power present is one nano-watt (for a frequency band of 1 GHz). This is well within the noise floor of any gas pipeline distribution network system and therefore does not interfere with operations of the natural gas distribution infrastructure.

Traditional wired and wireless network systems suffer from performance limitations caused by signal interference, ambient noise, and spurious noise. These limitations affect the available bandwidth, distance, and carrying capacity of the network system. With the network described in this invention (buried or shielded gas pipeline communication systems) the noise floor and outside signal interference in the gas pipeline is virtually zero. This is of course changed as these pipelines are excavated; moved, altered or damaged hence data integrity becomes a key aspect of the monitoring of third party tampering or damage of natural gas pipelines. This low noise on the gas pipeline network is a significant advantage to the ability of the system to detect variations within the natural gas pipeline infrastructure. wireless technology makes use of the noise floor to transmit data, without interfering with the injection of a concentrated power carrier signal. Moreover, wireless transmitted through a gas pipeline network has distinct advantages over its use in open air wireless applications. In a gas pipeline network environment, there are no concerns with intersymbol interference, and there are no concerns relating to multi-user interference.

The present invention provides an apparatus and method to enable gas pipeline infrastructures to augment their safety of service by delivering tampering and/or damage detection services simultaneously with natural gas delivery. Preferably, this tampering and/or damage detection services is delivered by introducing wireless signals into the existing natural gas delivery chain and routed via node and hub architecture into a network operations center (NOC) which acts as a tampering and/or damage detection services system operator's head-end.

Alternatively, wireless signals may be introduced into the gas pipeline distribution network at a plurality of locations, such as at the local distribution line 90 or at the gas main 80, or at any other suitable location.

In like fashion, network system operators can receive more data from individual tampering and/or damage detection services monitoring points by introducing end point generated data into existing contiguous gas pipeline. The present invention provides wireless communication across natural gas distribution networks and will be able to transmit and receive digital information for the purposes of tampering and/or damage detection services and other data exchanging purposes.

Figure 3:
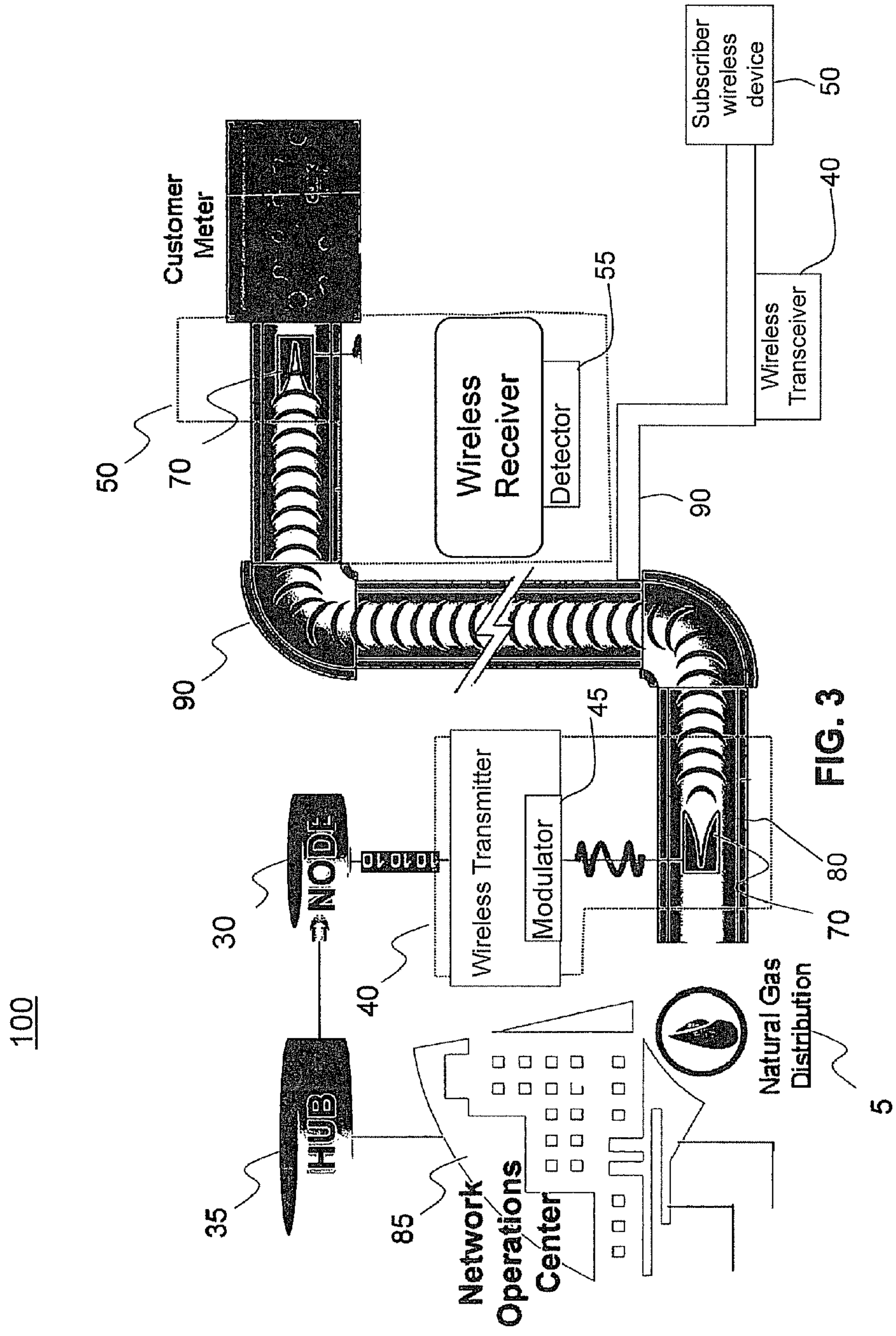
FIG. 3 is an illustration of a representative embodiment of an ultra-wideband tampering and/or damage detection system per this invention.

Referring to FIG. 3, the ultra-wideband communication within natural gas pipeline system 100 is configured to transmit ultra-wideband signals through an gas distribution network or system that includes steel, plastic or other pipe types. For example, the piped ultra-wideband (wireless) system 100 may transmit wireless signals through an existing or regional gas utility, which my be public, private, state, interstate or federal natural gas pipelines and may connect to an optical network, a cable television network, a community antenna television network, a hybrid fiber-coax television network, an Internet service provider network, a PSTN network, a WAN, LAN, MAN, TCP/IP network, a college campus, town, city, or any other type of network as defined above, that employs at least one leg of gas pipeline tampering and/or damage detection in whole or in part.

The wireless pulse duration and transmitted power may vary, depending on several factors. Different modulation techniques employ different wireless pulse timing, durations and power levels. The present invention envisions several different techniques and methods to transmit an wireless signal across a natural gas pipeline. One embodiment, may for example, use pulse position modulation that varies the timing of the transmission of the wireless pulses. One example of a pulse position modulation system may transmit approximately 10,000 pulses per second. This system may transmit groups of pulses 100 picoseconds early or 100 picoseconds late to signify a specific digital bit, such as a "0" or a "1". In this fashion a large amount of data may be transmitted across a natural gas pipeline.

An alternative modulation technique may use pulse amplitude modulation to transmit the wireless signal across a natural gas pipeline. Pulse amplitude modulation employs pulses of different amplitude to transmit data. Pulses of different amplitude may be assigned different digital representations of "0" or "1." Other envisioned modulation techniques include On-Off Keying that encodes data bits as pulse (1) or no pulse (0), and Binary Phase-Shift Keying (BPSK), or bi-phase modulation. BPSK modulates the phase of the signal (0 degrees or 180 degrees), instead of modulating the position. Spectral Keying, which is neither a PPM nor PAM modulation technique, may also be employed. It will be appreciated that other modulation techniques, currently existing or yet to be conceived, may also be employed.

A preferred modulation technique will optimize signal coexistence and pulse reliability by controlling transmission power, pulse envelope shape and Pulse Recurrent Frequencies (PRF). Both pseudo-random and fixed PRFs may be used, with the knowledge that a fixed PRF may create a "carrier-like frequency," which it and its higher order harmonics may interfere with the data carried in conventional RF carrier channels. However, with a pseudo-random PRF the difficulties encountered with a fixed PRF are usually avoided. One embodiment of a pseudo-random PRF modulation technique may include a wireless pulse envelope that is shaped by a process to distortion mapping to pre-condition and compensate for multi-path, distortion, interference frequency components that the natural gas pipeline may naturally introduce or attenuate. wireless pulse conditioning for the given natural gas pipeline has the additional advantage of controlling the power spectral density of the transmitted data stream.

Several advantages exist when transmitting wireless pulses through natural gas pipeline as opposed to transmitting wireless pulses through the air in a traditional free space wireless medium. Free space wireless wireless transmissions must consider such issues as Inter-Symbol Interference (ISI) and Multi-User Interference (MUI), regulatory power constraints, all of which can severely limit the bandwidth of wireless transmissions. Some modulation techniques, such as Pulse Amplitude Modulation (PAM), which offer the ability for high bit densities are not effective at long wireless distances. These, and other issues, do not apply to wireless pulses transmitted through natural gas pipelines. In addition, no variable multipath issues arise and there are no unpredictable propagation delay problems present in a natural gas pipeline network. Therefore, it is estimated that an ultra-wideband system may be able to transmit data across a natural gas pipeline network in a range from 100 Mbit/second to 10

Gbit/second. This data rate will ensure that the tampering and/or damage detection service requirement of a utility provider can be met.

A preferred embodiment of the tampering and/or damage detection service wireless device 40 will spread the signal energy of the wireless data stream across the a bandwidth that may range from 10 Hz to approximately 1 GHz or as discussed above, to 10 GHz, or higher. This will ensure that the signal energy present at any frequency is significantly below the thermal limit of the natural gas pipeline ensuring coexistence with conventional natural gas delivery.

For example, a wireless pulse would have a duration of about 1 nano-second in a wireless data stream that has a 1 GHz bandwidth. Alternatively, the wireless pulse duration would be tailored to match the full frequency of a natural gas pipeline network. A narrow pulse width is preferred because more pulses can be transmitted in a discrete amount of time. Pulse widths of up to 2 nano-seconds may be employed to guarantee pulse integrity throughout digitization, transmission, reception and reformation at the wireless subscriber device 50. Generally, an idealized pulse width would be calculated based on the frequency response of the specific natural gas pipeline system.

Referring to FIG. 3, the multiplicity of generated wireless pulses are sent from the utility service-provider 5 to the antenna 30 via a hub 35, which combines the wireless pulses with the natural gas distribution 90. One method to accomplish this task is to insert an antenna 70 carrying the wireless signals to a standard local natural gas main 80 directed toward the points of natural gas consumption. The wireless transceiver 401 is placed within the gas main 80 and gathers and provides data forwarded to and from the network operations center 85 via fiber optic transmitter/receiver in the hub 35 and node 30. The wireless transmitter 40 comprises a modulator 45 that is structured to transmit a plurality of wireless signals. The fiber optic transmitter/receiver in the hub 35 converts the multiplicity of wireless pulses received from the natural gas pipeline network 90 into a corresponding optical signal. The gas signal generator can be either an antenna placed within the active gas pipeline, an antenna placed at a non-metallic (e.g., plastic elbow joint such that the signal is radiated into the pipeline or other suitable configurations. The wireless signal is then distributed through the active gas pipelines to residential neighborhoods, business districts, universities, colleges or other locations for distribution through the natural gas pipelines to subscribers and customers. Other methods and techniques for combining a wireless pulse stream and an active (or decommissioned) gas pipelines may also be employed. For example, the wireless pulse stream may be sent to network hub 35, which will then transceive the tampering and/or damage detection signals.

Shown in FIG. 3, a fiber multiplexer node 30 may be located at any one of the locations described above. The optical signals are received by the multiplexer node 30 and are converted into the wireless pulsed signals and introduced into the pipeline 90 using the antenna 70 and wireless transmitter/transceiver 40. The combined wireless signals and natural gas are forwarded to a subscriber wireless device 50 located at the subscriber location. The subscriber wireless device 50 can be considered a tampering and/or damage detection gateway or router that provides detection data access to the wireless transceived across the natural gas pipeline 90. The wireless receiver 50 comprises a detector 55 structured to receive no less than one wireless signal.

One embodiment of the tampering and/or damage detection wireless device 50 will demodulate the multiplicity of wireless electromagnetic pulses back into a conventional RF carrier signal. The tampering and/or damage detection wireless device 50 may include all, some or additional components found in the service provider wireless device 40. In this manner, additional bandwidth will be available to the natural gas pipeline network to provide additional tampering and/or damage detection data and functionality demanded by the customer.

Figure 4:
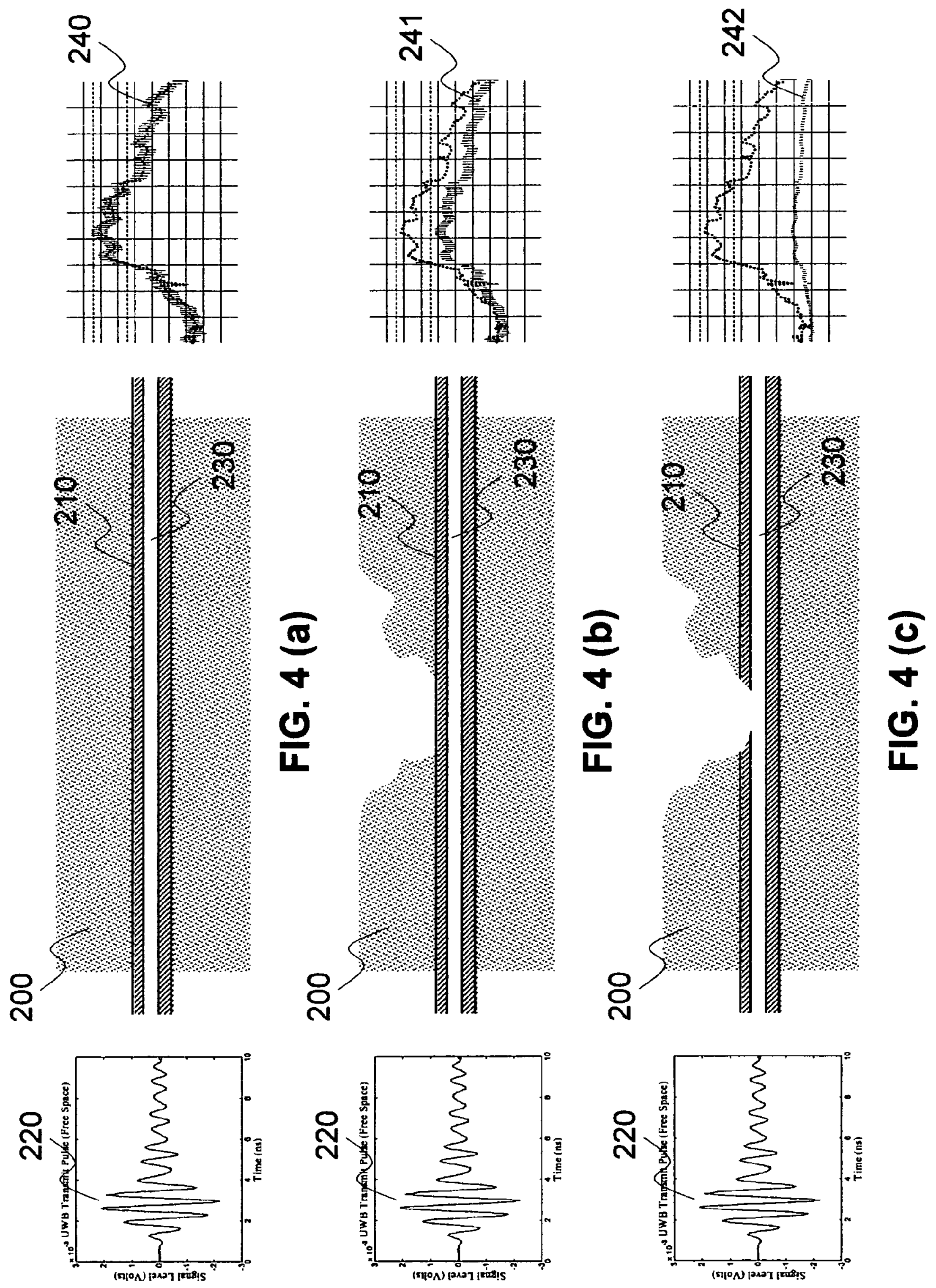
FIG. 4 is an illustration of a second representative embodiment of an ultra-wideband tampering and/or damage detection system per this invention.

An representative embodiment of the present invention operating in a damage detection applications is illustrated in FIG. 4. A full service natural gas pipeline (210) surrounds a path (230) of internal gas flow and wireless transmission (220) signals. In this representative embodiment the pipeline (210) is a non-conductive polyethylene. When the pipeline conveys the wireless transmission (220) without tampering or damage as shown in FIG. 4*a* the received normal signal (240) is altered from the transmitted signal (220) by the conveyance.

When tampering conditions FIG. 2*b* are present such as removing the earth (200) surrounding the pipeline (210) the received tampered signal (241) is altered from the normal received signal (240) as the conveyance path for this example of a non-conductive pipeline is no longer shielded by the surrounding earth (200).

When damage conditions FIG. 2*c* are present such as puncturing the pipeline (210) the received damage signal (242) is altered from the normal received signal (240) as well as the received tampered signal (241) as the conveyance path for this example is now mechanically different. The present invention of transmitting wireless signals across a natural gas pipeline can employ any type of piped media. For example, the piped media can include plastic, steel, iron, rigid, flexible, valved and metered. This type of piping is most commonly used for delivering natural gas over long and short distances. The foregoing list of pipe media is meant to be exemplary, and not exclusive.

As described above, the present invention can provide additional bandwidth to enable the transmission of large amounts of data over existing natural gas distribution networks, where the information carried across the natural gas pipeline network may be used in part for tampering and/or damage detection. Additional bandwidth can also be utilized for greater detection, classification and other safety features.

Thus, it is seen that an apparatus and method for tampering and/or damage detection of natural gas pipelines by transmitting and receiving ultra-wideband signals through an active natural gas pipeline is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs, other than the above-described embodiments, will fall within the literal and/or legal scope of the following claims, and the present invention is limited only by the claims that follow. It is noted that various equivalents for the particular embodiments discussed in this description may practice the invention as well.

What is claimed is:

1. An operational monitoring system for natural gas pipeline infrastructures, comprising:

a transmitter located at a first location arranged to transmit a wireless signal through natural gas contained within a pipeline infrastructure; and a receiver located at a second location structured to receive the wireless signal transmitted through said natural gas contained within said pipeline infrastructure; and means to analyze said received wireless signal indications of operational changes in said pipeline infrastructure, wherein the transmitter comprises a modulator that is structured to transmit a plurality of wireless signals.

2. The operational monitoring system of claim 1, wherein the means to analyze said received wireless signal includes a microprocessor or a Digital Signal Processor.

3. The operational monitoring system of claim 1, wherein the wireless signal comprises a pulse of electromagnetic energy having a duration that can range between about 0.05 nanoseconds to about 100 nanoseconds.

4. The operational monitoring system of claim 1, wherein the wireless signal is transmitted at a wireless transmission power within a range of about 100 power decibels to about −90 power decibels, as measured at a single frequency.

5. The operational monitoring system of claim 1, wherein the receiver comprises a detector structured to receive no less than one wireless signal.

6. The operational monitoring system of claim 1, wherein a pipe employed in the said pipeline infrastructure is selected from the group consisting of: steel, plastic, iron, copper or a gas containment material.

7. The operational monitoring system of claim 1, wherein the transmitter or receiver of the pipeline infrastructure is connected at no less than one location to a network selected from a group consisting of: power line, optical, coaxial, wireless, a community access television network, a hybrid fiber coax system network, a public switched telephone network, a wide area network, a local area network, a metropolitan area network, a TCP/IP network, a dial-up network, a switched network, a dedicated network, a nonswitched network, a public network and a private network.

8. An operational monitoring system for natural gas pipeline infrastructures, comprising:

a transmitter located at a first location arranged to transmit a wireless signal through natural gas contained within a pipeline infrastructure; and a receiver located at a second location structured to receive the wireless signal transmitted through said natural gas contained within said pipeline infrastructure; and means to analyze said received wireless signal indications of operational changes in said pipeline infrastructure, wherein the transmitter and receiver are disposed in a common location such that wireless transmissions from the transmitter are reflected by the pipeline infrastructure and are received at the receiver.

9. A method of operational monitoring in a utility pipeline infrastructure, the method comprising:

transmitting from a transmitter a wireless signal through a contents of a pipeline infrastructure;

receiving said transmitted wireless signal which has traversed said contents of said pipeline infrastructure; and analyzing said received traversed signal for indications of operational significance, wherein the transmitter comprises a modulator that is structured to transmit a plurality of wireless signals.

10. The method of claim 9, wherein the pipeline infrastructure comprises a natural gas utility pipeline infrastructure selected from the group consisting of: a local gas utility, a regional gas utility, a private gas distribution infrastructure, and a public gas distribution infrastructure.

11. The method of claim 9, wherein at least one point of wireless signal transmission and least one point of wireless signal reception are arranged as selected from the group consisting of: point-to-point, point-to-multipoint, multipoint-to-point, multipoint-to-multipoint and radar.

12. The method of claim 9, wherein the wireless signal comprises one or any combination of a pulse of electromagnetic energy having a duration that can range between about 0.05 nanoseconds to about 100 nanoseconds.

13. The method of claim 9, wherein the transmitting comprises transmitting the wireless signal at a transmission power within a range between about 100 power decibels to about −90 power decibels, as measured at a single frequency.

14. The method of claim 9, wherein the transmitting the wireless signal comprises transmitting information selected from a group consisting of: test patterns, data sets, network traffic, telephony data, high-speed data, digital video data, digital television data, Internet communication data, audio data, predetermined indexes and spectral characterization patterns.

15. The method of claim 9, wherein the wireless signal is transmitted simultaneously with natural gas utility service.

16. The method of claim 9, wherein the operational monitoring utilizes differences between the transmitted and received wireless signals to determine indications of operational significance.

17. The method of claim 9, wherein the wireless signal and a natural gas utility distribution use a substantially common pathway for electromagnetic radiation spectrum and natural gas conveyance.

18. The method of claim 9, wherein wireless signals are transmitted in a frequency band that can range from between about 10 MHz to about 80 GHz.

19. The method of claim 9, wherein the multiple wireless signals transmitted from the modulator utilize separate portions of the electromagnetic radiation spectrum.

20. A method of collecting operational, damage, tampering, real-time or historical information regarding gas pipelines, the method comprising:

broadcasting from a transmitter at least one wireless signal within a gas in a gas utility distribution pipeline infrastructure;

receiving at least a portion of said wireless signal broadcasted through said gas in the said gas utility distribution pipeline infrastructure; and subsequently analyzing data or signal errors in the received portion of the wireless signal to determine indications' of operational, damage, tampering, trend and/or temporal significance, wherein the transmitter comprises a modulator that is structured to transmit a plurality of wireless signals.

21. The method of claim 20, wherein said wireless signal comprises a modulated data transmission.

22. The method of claim 21, wherein said subsequent analysis of data or signal errors in the received wireless signal is performed in part by a microprocessor or digital signal processor.

23. The method of claim 20, wherein said subsequent analysis of the received wireless signal is performed at a central location.

* * * * *